(12) United States Patent
Furnish

(10) Patent No.: US 6,751,871 B2
(45) Date of Patent: Jun. 22, 2004

(54) VEGETATION CUTTER/CATCHER

(76) Inventor: Allen R. Furnish, 7906 57th St. E., P.O. Box 981, Sumner, WA (US) 98390

( * ) Notice: Subject to any disclaimer, the term of this patent is extended or adjusted under 35 U.S.C. 154(b) by 132 days.

(21) Appl. No.: 09/957,366

(22) Filed: Sep. 20, 2001

(65) Prior Publication Data

US 2003/0051348 A1 Mar. 20, 2003

(51) Int. Cl.$^7$ .................................................. B26B 7/00
(52) U.S. Cl. ................................................ 30/276; 56/12.7
(58) Field of Search ............................ 30/276; 56/12.7; D8/8

(56) References Cited

U.S. PATENT DOCUMENTS

| | | | | |
|---|---|---|---|---|
| 3,877,146 A | * | 4/1975 | Pittinger | 30/276 |
| 4,089,114 A | * | 5/1978 | Doolittle et al. | 30/276 |
| 4,122,601 A | * | 10/1978 | Katsuya | 30/276 |
| 4,200,978 A | * | 5/1980 | Irelan et al. | 30/276 |
| 4,641,431 A | * | 2/1987 | Leming et al. | 30/276 |
| 4,712,364 A | * | 12/1987 | Oxley | 30/276 |
| 4,715,123 A | * | 12/1987 | John et al. | 30/276 |
| 4,722,139 A | * | 2/1988 | Mahler | 30/276 |
| 4,765,127 A | * | 8/1988 | Hamblen | 30/276 |
| 4,964,472 A | * | 10/1990 | Cleworth | 56/12.9 |
| 4,987,681 A | * | 1/1991 | Sepke | 30/276 |
| 5,271,212 A | * | 12/1993 | Anderson | 56/12.7 |
| 5,493,783 A | * | 2/1996 | Oostendorp | 30/276 |
| 5,588,289 A | * | 12/1996 | Wilson | 30/296.1 |
| 5,771,670 A | * | 6/1998 | Perry | 30/276 |
| 5,862,595 A | * | 1/1999 | Keane | 30/276 |
| 6,067,718 A | * | 5/2000 | Vik | 30/276 |
| 6,105,253 A | * | 8/2000 | Kolbert | 30/276 |
| 6,134,789 A | * | 10/2000 | Strickland | 30/276 |
| 6,213,677 B1 | * | 4/2001 | Yamane et al. | 56/12.7 |
| 6,249,978 B1 | * | 6/2001 | Sheldon | 30/276 |
| 6,327,782 B1 | * | 12/2001 | Blevins | 30/276 |
| 6,460,253 B1 | * | 10/2002 | Wheeler et al. | 30/276 |
| 6,539,694 B2 | * | 4/2003 | Oxley | 56/12.7 |
| 6,550,145 B2 | * | 4/2003 | Stoll et al. | 30/276 |

* cited by examiner

Primary Examiner—Allan N. Shoap
(74) Attorney, Agent, or Firm—Delbert J. Barnard

(57) ABSTRACT

A cutting blade (58) is secured to the lower end of a flexible drive shaft (18). Drive shaft (18) extends from the blade (58) upwardly through a tubular handle (12). The upper end of the drive shaft (18) is connected to the output of a drive motor (14). The cutting blade (58) is within a housing (10) having a bottom opening (64) and three lower side openings (72, 74, 76). A cutting blade (58) includes a pair of section vanes (104) which when the cutting blade 58) is rotating serve to pull air into the housing (10) through the lower sidewall openings (72, 74, 76). The moving air picks up the cuttings and moves them rearwardly into a cuttings bag (92) which is connected to and supported from a rear portion of the housing (10).

19 Claims, 4 Drawing Sheets

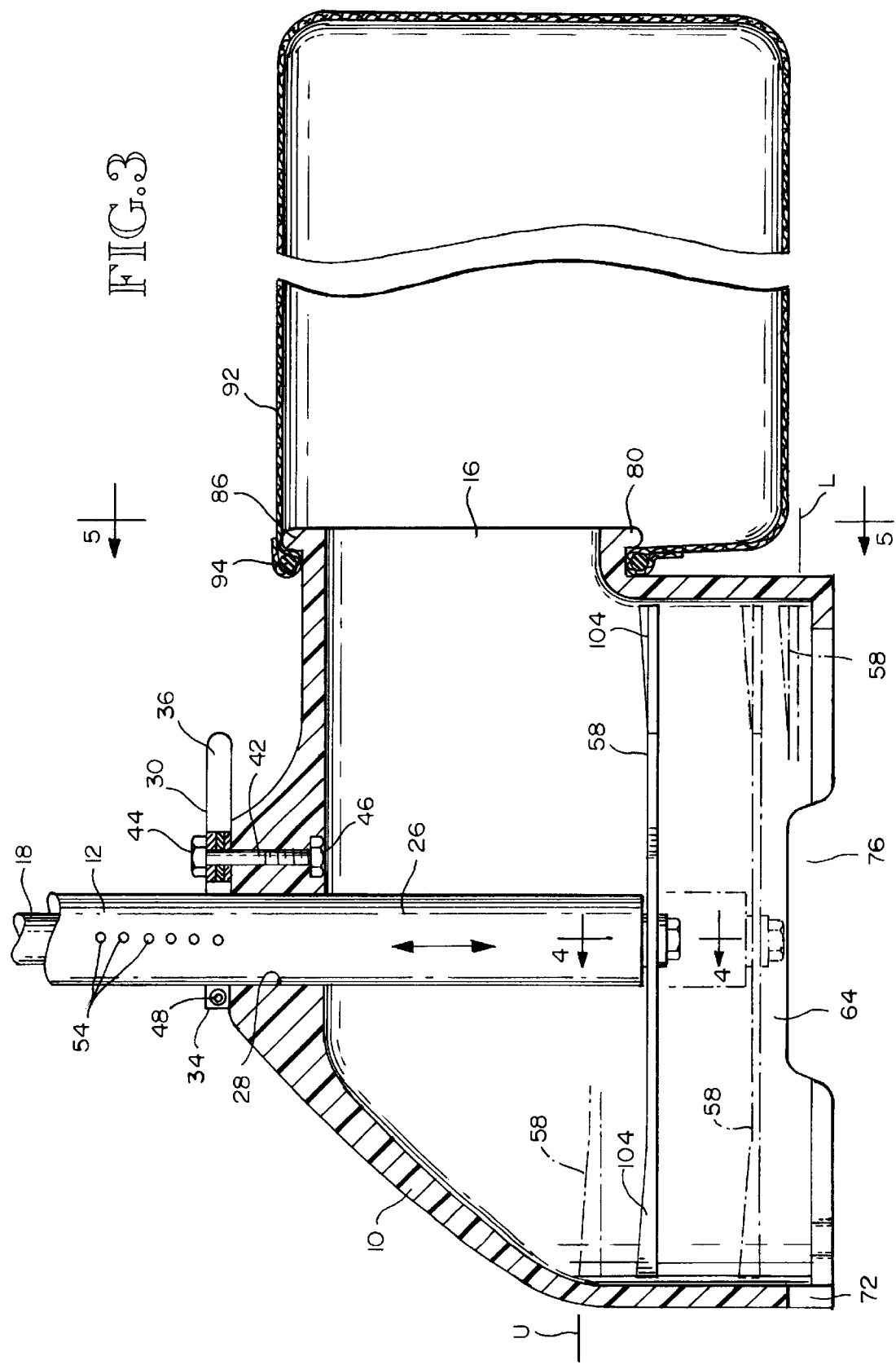

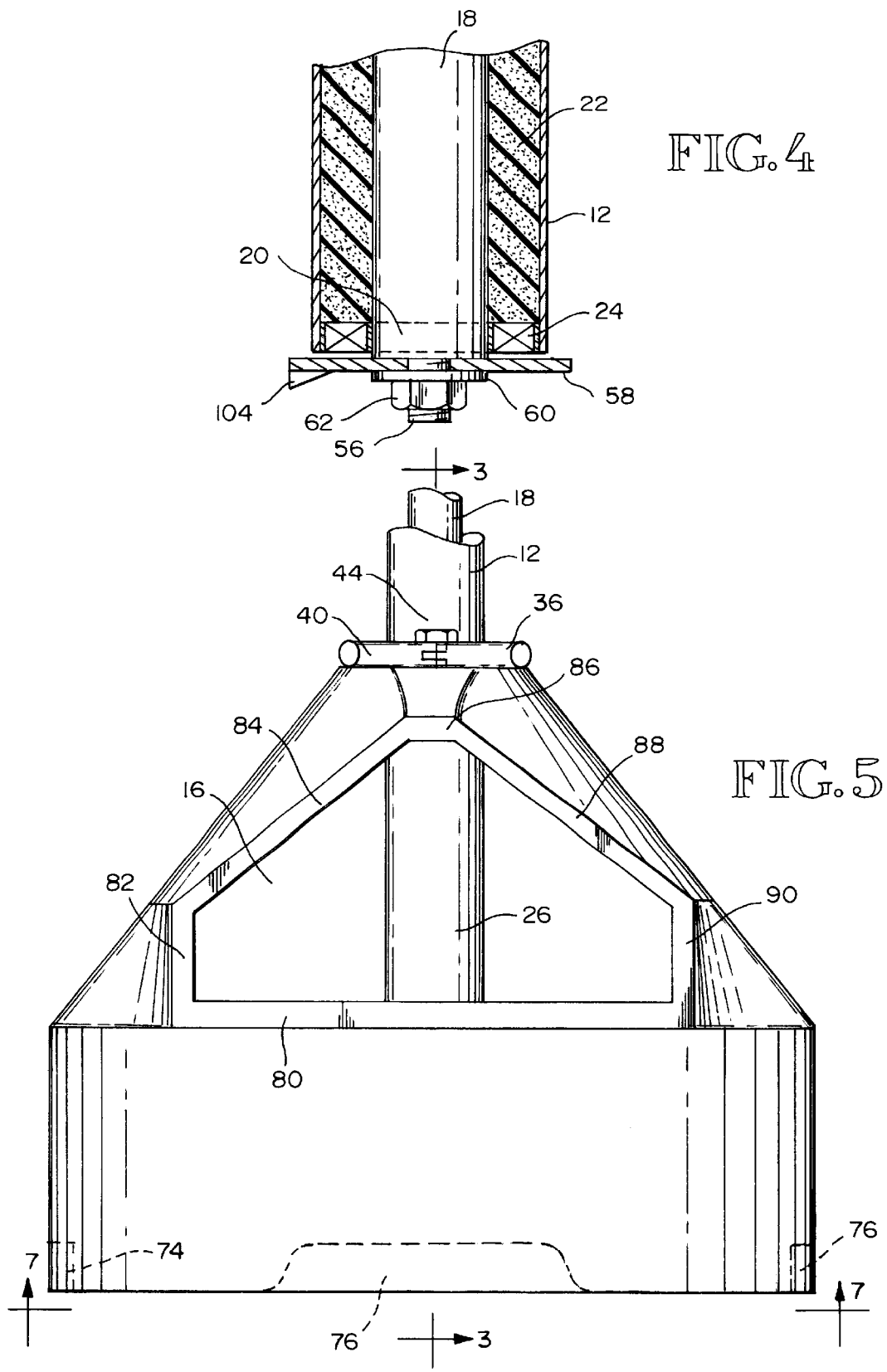

VEGETATION CUTTER/CATCHER

TECHNICAL FIELD

This invention relates to a power tool for cutting vegetation, such as grass, and immediately catching the cuttings. More particularly, it relates to a hand-held tool having an elongated handle with a cutting blade at its lower end, within a housing, and a cuttings bag secured to the housing, and a drive motor at the upper end of the handle connected to the cutting blade by a flexible drive shaft.

BACKGROUND OF THE INVENTION

A common form of lawn mower includes a blade that rotates about a vertical axis. The blade is within a housing that is supported by wheels. A drive motor is mounted on the housing and is connected to the cutting blade. A handle projects rearwardly from the housing and includes a handle bar at its upper end. The user stands behind the handle and grasps the handle bar. While walking, he or she pushes on the handle bar to move the housing and cutting blade relatively over the lawn. The cutting blade is positioned relative to the wheels such that it will cut the lawn to a desired height. Some of these lawn mowers include a cutting catcher, e.g. A bag, that is connected to and is supported from the housing.

Another form of vegetation cutter has a smaller blade (or a cutting line) within a housing at the lower end of a handle but without wheels. The drive motor is sometimes mounted at the upper end of the handle and is other times mounted on the housing at the lower end of the handle. This type of cutter is usually used for trimming around the edges of the lawn. The present invention relates to improvements in this second type of vegetation cutter.

Herein the term "vegetation" is used to mean grass, other types of ground cover, bushes and other types of plant growth that from time to time need to be cut or trimmed.

BRIEF SUMMARY OF THE INVENTION

In basic form, the vegetation cutter/catcher of the present invention comprises a housing having a top portion that includes a top opening, a side portion that includes a discharge opening, a bottom opening, and a base flange that borders the bottom opening. A handle is provided that has a lower end portion that includes a lower end and an upper portion that includes an upper end. The lower end portion of the handle extends downwardly from the top opening in the top portion of the housing. The upper end portion of the handle extends upwardly from the top opening in the top portion of the housing. A drive motor is mounted on the upper end portion of the handle. The drive motor includes a rotary output. A flexible drive shaft extends downwardly through the handle from the rotary output of the drive motor to a lower end that is adjacent the lower end of the handle. A cutting blade is provided in the housing wherein it is attached to the lower end of the flexible drive shaft. A cuttings bag is connectable to the housing. The cuttings bag has an enclosure wall that includes an inlet opening that is placed into registry with the opening in the side portion of the housing. In use, the bottom opening of the housing is moved towards vegetation that is to be cut. The motor is operated to rotate the drive shaft and the cutting blade so that the blade will cut vegetation that it encounters. The cuttings move into and through the housing and into the cuttings bag.

According to an aspect of the invention, there is at least one lower side opening in the side portion of the housing and a corresponding void in the base flange. In the preferred embodiment, there is a lower side opening that is diametrically opposite the discharge opening in the side portion of the housing.

The present invention includes providing a plurality of lower side openings in the side portion of the housing and spacing them apart circumferentially around the housing. The base flange includes a void for each side opening. In preferred form, there are three lower side openings. One of them is generally diametrically opposite the discharge opening in the side portion of the housing. The other two lower side openings are generally diametrically opposite each other. Each is circumferentially between the first lower side opening and the discharge opening.

Another aspect of the invention is to make the lower end portion of the handle vertically adjustable in position in the top opening. An adjustable lock is provided for locking the handle into a selected position relative to the housing, for the purpose of establishing the cutting position of the cutting blade relative to the bottom opening in the base flange.

The present invention includes using a cutting blade that comprises at least one suction vane that is configured to create suction within the housing between the bottom opening and the discharge opening, for assisting movement of the cuttings into and through the housing and into the cuttings bag.

The present invention includes providing the base flange with a lower surface that is positioned to be brought into contact with vegetation that is to be cut so that it will serve as a support surface for the cutter/catcher.

An important object of the present invention is for the weight of the vegetation cutter/catcher to be substantially balanced so that when a user grasps the handle the weight of the drive motor at the top of the handle will be substantially balanced by the weight of the housing and cutting blade at the bottom of the unit.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals and letters are used to designate like parts throughout the several views of the drawing, and:

FIG. 3 is an enlarged scale sectional view taken substantially along line 3—3 of FIG. 5, but with the handle, the cutting bag and a mounting bolt for the lock jaws being shown in elevation;

FIG. 4 is a fragmentary sectional view taken substantially along line 4—4 of FIG. 3;

FIG. 5 is a sectional view taken substantially along line 5—5 of FIG. 3, with the parts that are in view shown in elevation;

DETAILED DESCRIPTION OF THE INVENTION

Figure 1:
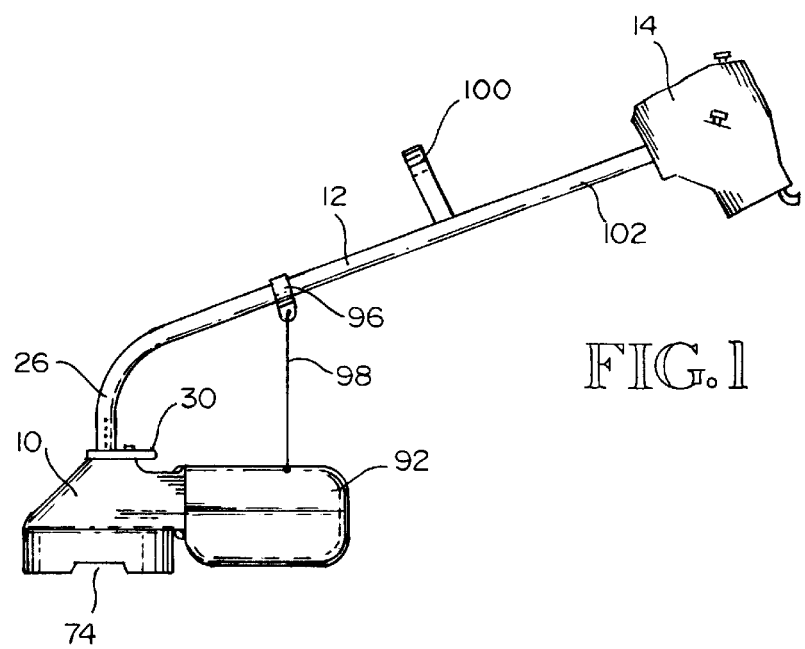
FIG. 1 is a side elevational view of an embodiment of the invention.

Referring to FIG. 1, the vegetation cutter/catcher of the present invention comprises a housing 10 at a lower end of a handle 12 and a drive motor 14 at an upper end of the handle 12. Housing 10 includes an open lower end and a generally domed shaped enclosure above the lower end. The dome shaped enclosure includes a discharge opening 16 (FIGS. 3 and 5) extending rearwardly from the housing 10.

Handle 12 may be constructed from thin walled metal or plastic tubing. A flexible drive shaft 18 extends through the handle 12, from the output of the drive motor 14 to a lower end portion 20. As is known per se, the drive shaft 18 is supported by a foam plastic sleeve 22 that is between the handle 12 and the drive shaft 18. A bearing 24 may be provided at the lower end of the handle 12, between it and the lower end 20 of the drive shaft 18 (FIG. 4). The flexible shaft technology is per se known and therefore it does not need to be described in detail.

The drive motor 14 may be an electric motor or it may be a gas motor. A gas motor is preferred because it allows the cutter/catcher to be moved around a yard without the burden of handling the electric cord that an electric motor requires.

Figure 2:
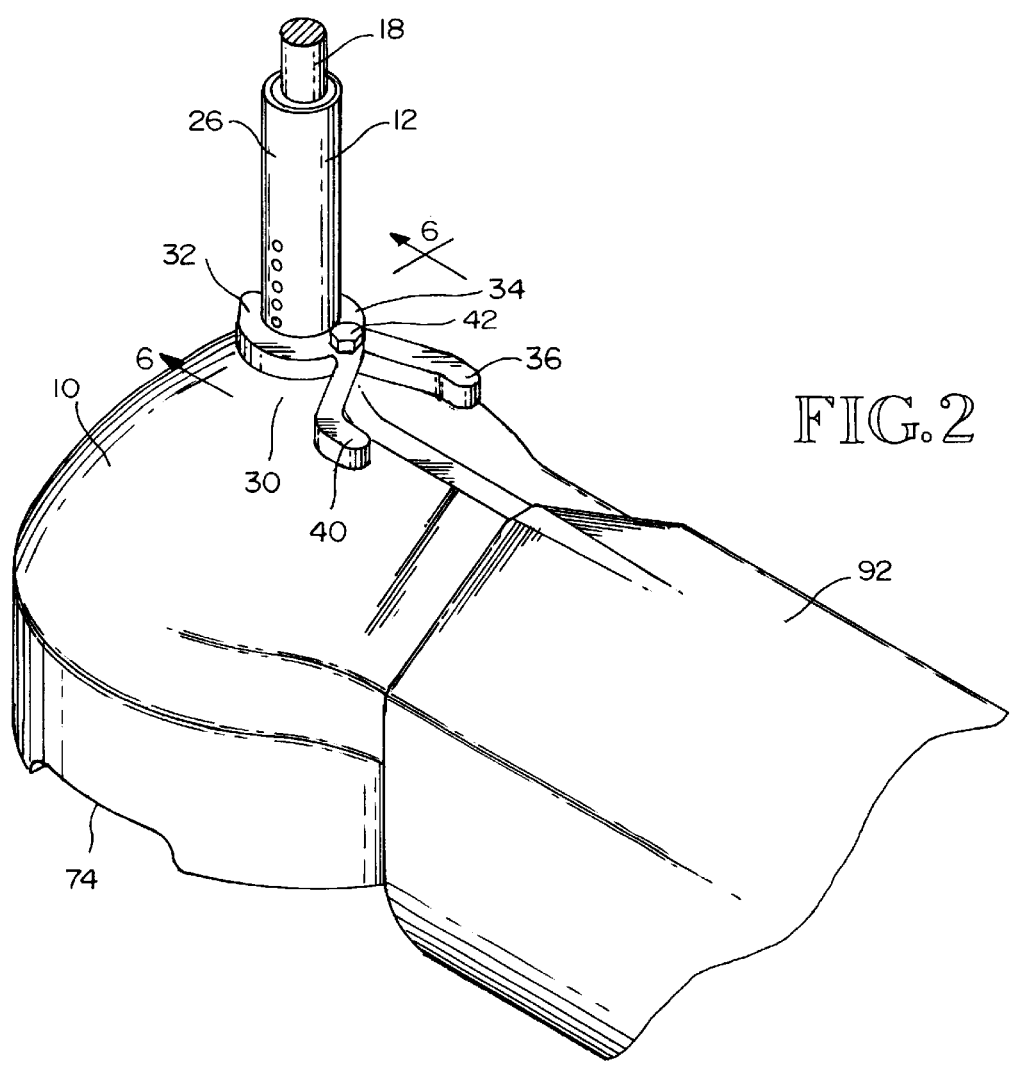
FIG. 2 is an enlarged scale fragmentary pictorial view of a lower portion of the vegetation cutter/catcher that is shown in FIG. 1, such view being taken from above and looking towards the rear and one side of a housing and cuttings bag at the lower end of the tool, with the upper portion of the handle and drive shaft cut away, and with the rear portion of the cuttings bag cut away.

Referring to FIGS. 1 and 3, the handle 12 includes a generally vertically extending lower end portion 26. It extends downwardly through a vertical opening 28 formed in the top of the housing 10. Opening 28 is long enough to serve as a bearing for the handle portion 26. Handle portion 26 is moved vertically through opening 28 and is selectively securable to the housing 10 by use of a lock structure 30. By way of typical and therefore non-limitive example, the lock structure 30 may be like a pair of pliers. It may comprise a pair of jaws 32, 34 and a pair of handles 36, 40. As best shown by FIG. 2, handle 36 is connected to jaw 32 and handle 40 is connected to jaw 34. A vertical bolt 42 extends through both members 32, 36 and 34, 40 and connects them to the top of the housing 10. As shown by FIG. 3, a bolt head 44 may be at the top and a nut 46 may be at the bottom of bolt 42. A spring 48 may be interconnected between the ends of the jaws 32, 34. Or, a torsion spring may be provided around the nut 42. In any event, a spring is used for biasing the two jaws together.

Figure 6:
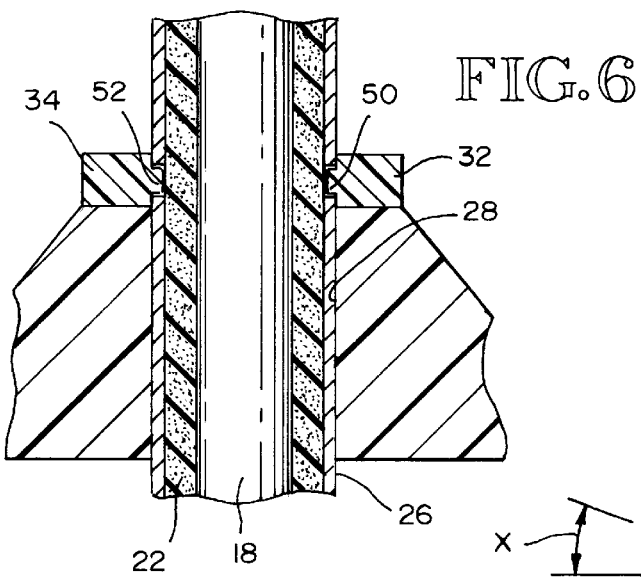
FIG. 6 is a fragmentary sectional view taken substantially along line 6—6 of FIG. 2.

Referring to FIG. 6, jaws 32, 34 include pins or lugs 50,52. In the illustrated embodiment, lug 50 is on the inside of jaw 32. Lug 52 is on the inside of jaw 34. The straight lower end section 26 of the handle 12 includes a series of lug receiving openings 54 on each of its sides. The openings 54 on one side receive the lugs 50. The openings on the second side receive the lugs 52. The two handles 36, 40 are squeezed together. This moves the jaws 32, 34 apart and moves the lugs 50, 52 out from the particular openings that they were in. Then, the handle section 26 is slid either up or down through the opening 28, relative to the housing 10. When it is at a desired height, a final adjustment is made to place the lugs 50, 52 in the closest openings 54 so that the lock structure 30 will serve to lock the handle 12 in position relative to the housing end.

As shown by FIGS. 3 and 5, the lower end portion of the drive shaft 18 includes a threaded stud 56. Stud 56 is moved through a hub opening in a cutting blade 58. Then, a washer 60 and a nut 62 are attached to the stud 56. Nut 56 is tightened and this clamps the hub portion of the cutting blades 58 between the washer 60 and the end of the drive shaft 18.

Figure 7:
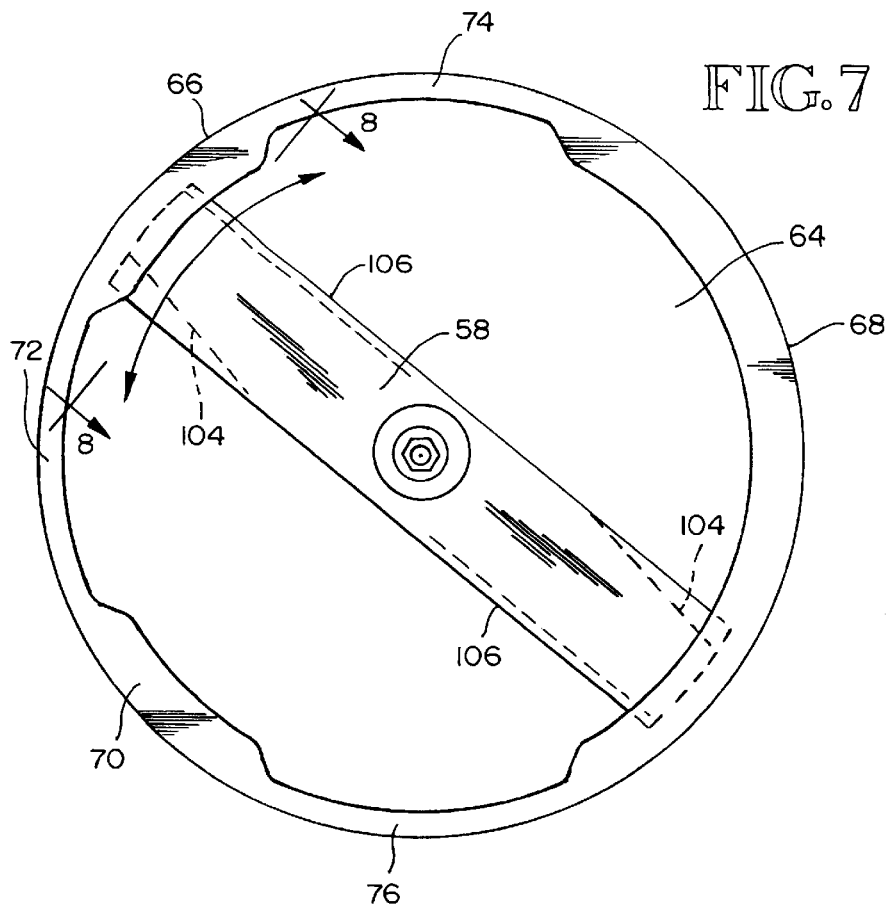
FIG. 7 is a bottom plan view taken substantially from the aspect of line 7—7 of FIG. 5.

As shown by FIGS. 2, 3 and 5, the housing 10 has a cylindrical lower portion that is a part of its enclosure wall. Housing 10 includes a lower end opening 64 best shown in FIG. 7. Opening 64 is the main inlet for the housing 10. Opening 64 is surrounded by a sectional annular flange 66, 68,70. Each flange section 66, 68, 70 may measure about one-half inch—one inch in the radial direction. Flange section 66, 68, 70 provide a base flange for the housing 10, allowing it to be set down onto a lawn, for example, and be supported without digging in.

The housing 10 is provided with at least one lower sidewall opening 72. The preferred embodiment includes three sidewall openings 72, 74, 76. The arc length of each opening 72, 74, 76 may be about forty-five degrees (45°). However, this is a variable and the arc length may vary, depending on the number of openings. For example, a given tool may have a single opening 72 that has an arc length of at least ninety degrees (90°). In the illustrated embodiment, sidewall opening 72 is diametrically opposite the rear end opening 16 in the housing 10. Sidewall openings 74, 76 are substantially diametrically opposite each other. Opening 74 is spaced circumferentially from opening 72 and is between opening 72 and opening 16. Opening 76 is also spaced circumferentially from opening 72 and it is between opening 72 and opening 16. As clearly shown by FIG. 7, voids are provided between the flange sections 64, 66, 78. That is, there is no flange section in the vicinity of each opening 72, 74, 76. The openings 72, 74, 76 extend through both the sidewall of the housing 10 and the base flange portion of the housing 10.

FIG. 3 shows the cutting blade 58 in an intermediate position. It also includes a fragmented broken line showing of the uppermost position U and another fragmented broken line showing of the lowermost position L. A second intermediate position is indicated by a broken line showing the blade 58.

In the preferred embodiment, the rear opening 16 is shown in the nature of a six-sided opening, formed of side portions 80, 82, 84, 86, 88, 90. These side portions 80, 82, 84, 86, 88, 90 may provide a radially outwardly projecting lip at the mouth of the opening 16. As shown by FIG. 3, a cutting bag 92 may be connected to the housing 10 at the region of this lip. As is known per se, a front end opening in the cutting bag 92 may be provided with an expandable member 94 that snaps onto and grips the housing 10 immediately inside of the lip. Member 94 may be a metal spring, or an elastic cord, for example. Of course, other suitable ways can be used of securing the open mouth of the cutting bag 92 to the housing 10 about the discharge opening 16.

As shown by FIG. 1, handle 12 may be provided with a member 96 to which the upper end of a tether 98 may be attached. Tether 98 extends downwardly from member 96 to the cutting bag 92 and supports some of the weight of the cutting bag 92 and its contents. As also shown by FIG. 1, the handle 12 may be provided with a handhold 100. This may be a ring-like structure that is attached to the handle 12 and projects upwardly from the handle 12. The user can grasp the upper portion of the ring 100 and hold the tool in that manner, with the second hand of the user being used to hold and guide the upper portion 102 of the handle 12.

Figure 8:
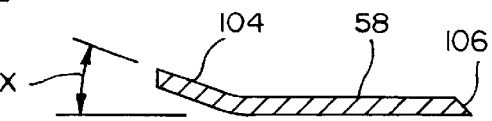
FIG. 8 is a cross sectional view through the cutting blade, taken substantially along line 8—8 of FIG. 7.

Preferably, the cutting blade 8 is provided with suction vanes 104. These vanes 104 project upwardly at an angle X from the general plane of blade 58 (FIG. 8). The opposite or forward edge of the blade 58 may be beveled at 106 to form a rather sharp cutting edge. By way of typical and therefore non-limitive example the cutting blade may measure about seven and one-quarter inches long. Angle X may be about thirty-three. The cutting bag 92 may be about five and one-half inches in diameter. The length may vary from about six inches to about nine inches. Lower sidewall openings may be about one-half inch tall by about three inches long.

The lowermost position of adjustment of the cutting blade 58, designated L, places the outer ends of the cutting blade 58 a short distance above the base flange section. The uppermost position designated U is below where the outer ends of the blade 58 would make contact with the upwardly and inwardly sloping dome portion of the housing 10. During use, when the base flange is down on the ground, some air can enter through the opening 72, 74, 76 while the grass or other vegetation to be cut enters into the housing 10 through the bottom opening 64. The rotating cutting blade 58 both cuts the vegetation and creates a suction, pulling the air into and through the housing 10. The moving airstream carries the cuttings with it into the cuttings bag 92.

When the tool is resting on the ground, the open area of the three lower side openings 72, 74, 76, is smaller than the discharge opening 16. This provides for a good vacuum effect.

As previously mentioned, the cutting blade may measure about seven and one-quarter inches long, or thereabouts. In other words, the tool is not to be compared with a standard rotary blade lawnmower having blades measuring between sixteen inches–thirty-two inches in length. The tool is a portable tool that can be picked up and easily moved from place to place. In this respect, it has some similarities to a string trimmer but has some notable advantages over a string trimmer. The relationship of the base flange sections 66, 68, 70 to the blade 58 is such that the blade 58 can never gouge the ground. If one side of the tool should be lifted upwardly from the ground, the low side will still keep the low end of the blade 58 spaced a desired distance above the grass or other vegetation that is being trimmed. Also, the blade 58 is protected against cutting the bark of a tree when trimming up next to the tree. The sidewall of the housing will contact a tree and keep the outer ends of the blade 58 spaced away from the tree. Another advantage of the tool is that it will not throw rocks. Any rocks within the housing that may be contacted by the blade 58 will be kept within the housing or will be moved into the cuttings bag.

The illustrated embodiment is only an example of the present invention and, therefore, is non-limitive. It is to be understood that many changes in the particular structure, materials and features of the cutter/catcher may be made without departing from the spirit and scope of the invention. Therefore, it is my intention that my patent rights not be limited to the particular embodiments illustrated and described herein, but rather are to be determined by the following claims, interpreted according to accepted rules of claim interpretation, including use of the doctrine of equivalents and reversal of parts.

What is claimed is:

1. A vegetation cutter/catcher, comprising:

a housing having a top portion that includes a top opening, a side portion that includes a discharge opening, a bottom opening, and a base flange that borders said bottom opening;

a handle having a lower end portion that includes a lower end and an upper end portion that includes an upper end, said lower end portion extending downwardly through the top opening in the top portion of the housing and said upper end portion extending upwardly from the top opening in the top portion of the housing away from the housing;

a drive motor mounted on the upper end portion of the handle remote from said housing, said drive motor including a rotary output;

a flexible drive shaft extending downwardly through the handle from the rotary output of the drive motor to a lower end that is adjacent the lower end of the handle;

a cutting blade in said housing attached to the lower end of the flexible drive shaft; and a cuttings bag having an enclosure wall that includes an inlet opening, said cuttings bag being connectable to the housing below the upper end portion of the handle, with the inlet opening of the cuttings bag in registry with the discharge opening in the side portion of the housing, whereby the bottom opening of the housing may be moved towards vegetation that is to be cut, and the motor may be operated to rotate the drive shaft and the cutting blade so that the blade will cut vegetation that it encounters, and cuttings will move into and through the housing and into the cuttings bag; and wherein the lower end portion of the handle is vertically adjustable in position in the top opening, and an adjustable lock is provided for locking it into a selected position relative to the housing for the purpose of establishing the cutting position of the cutting blade relative to the bottom opening and the base flange.

2. The vegetation cutter/catcher of claim 1, comprising at least one lower side opening in the side portion of the housing and a corresponding void in the base flange.

3. The vegetation cutter/catcher of claim 2, wherein the lower side opening is diametrically opposite the discharge opening in the side portion of the housing.

4. The vegetation cutter/catcher of claim 2, comprising a plurality of said lower side openings in the side portion of the housing spaced circumferentially around the housing, with said base flange including a said void for each said side opening.

5. The vegetation cutter/catcher of claim 4, comprising three lower side openings, wherein one of said lower side openings is generally diametrically opposite the discharge opening in the side portion of the housing and the other two lower side openings are generally diametrically opposite each other and each is circumferentially between the first lower side opening and the discharge opening.

6. The vegetation cutter/catcher of claim 1, comprising at least one lower side opening in the side portion of the housing and a corresponding void in the base flange.

7. The vegetation cutter/catcher of claim 6, wherein the lower side opening is diametrically opposite the discharge opening in the side portion of the housing.

8. The vegetation cutter/catcher of claim 6, comprising a plurality of said lower side openings in the side portion of the housing spaced circumferentially around the housing, with said base flange including a said void for each said side opening.

9. The vegetation cutter/catcher of claim 8, comprising three lower side openings, wherein one of said lower side openings is generally diametrically opposite the discharge opening in the side portion of the housing and the other two lower side openings are generally diametrically opposite each other and each is circumferentially between the first lower side opening and the discharge opening.

10. The vegetation cutter/catcher of claim 1, further comprising at least one suction vane on the cutting blade that is configured to create a suction within the housing between the bottom opening and the discharge opening, for assisting movement of cuttings into and through the housing and into the cuttings bag.

11. The vegetation cutter/catcher of claim 10, comprising at least one lower side opening in the side portion of the housing and a corresponding void in the base flange.

12. The vegetation cutter/catcher of claim 11, wherein the lower side opening is diametrically opposite the discharge opening in the side portion of the housing.

13. The vegetation cutter/catcher of claim 11, comprising a plurality of said lower side openings in the side portion of the housing spaced circumferentially around the housing, with said base flange including a said void for each said side opening.

14. The vegetation cutter/catcher of claim 13, comprising three lower side openings, wherein one of said lower side openings is generally diametrically opposite the discharge opening in the side portion of the housing and the other two lower side openings are generally diametrically opposite each other and each is circumferentially between the first lower side opening and the discharge opening.

15. The vegetation cutter/catcher of claim 1, wherein the base flange includes a lower surface positioned to be brought into contact with the vegetation that is being cut and serving as a support surface for the cutter/catcher.

16. The vegetation cutter/catcher of claim 15, comprising at least one lower side opening in the side portion of the housing and a corresponding void in the base flange.

17. The vegetation cutter/catcher of claim 16, wherein the lower side opening is diametrically opposite the discharge opening in the side portion of the housing.

18. The vegetation cutter/catcher of claim 16, comprising a plurality of said lower side openings in the side portion of the housing spaced circumferentially around the housing, with said base flange including a said void for side opening.

19. The vegetation cutter/catcher of claim 18, comprising three lower side openings, wherein one of said lower side openings is generally diametrically opposite the discharge opening in the side portion of the housing and the other two lower side openings are generally diametrically opposite each other and each is circumferentially between the first lower side opening and the discharge opening.

* * * * *